(12) United States Patent
DeCraene et al.

(10) Patent No.: US 9,004,586 B2
(45) Date of Patent: Apr. 14, 2015

(54) VEHICLE SEAT ASSEMBLY

(71) Applicant: E.V.S. Ltd., South Bend, IN (US)

(72) Inventors: James E. DeCraene, South Bend, IN (US); Jeffry H. Wells, South Bend, IN (US)

(73) Assignee: E.V.S. Ltd., South Bend, IN (US)

( * ) Notice: Subject to any disclaimer, the term of this patent is extended or adjusted under 35 U.S.C. 154(b) by 0 days.

(21) Appl. No.: 14/073,968

(22) Filed: Nov. 7, 2013

(65) Prior Publication Data

US 2014/0054943 A1 Feb. 27, 2014

Related U.S. Application Data

(62) Division of application No. 12/752,250, filed on Apr. 1, 2010.

(60) Provisional application No. 61/165,598, filed on Apr. 1, 2009, provisional application No. 61/309,185, filed on Mar. 1, 2010.

(51) Int. Cl.
*B60N 2/14* (2006.01)
*B60N 2/06* (2006.01)

(52) U.S. Cl.
CPC ............... *B60N 2/146* (2013.01); *B60N 2/062* (2013.01); *B60N 2/14* (2013.01); *B60N 2/143* (2013.01)

(58) Field of Classification Search
USPC .................. 297/344.22, 344.26, 130, 344.24, 297/440.22
See application file for complete search history.

(56) References Cited

U.S. PATENT DOCUMENTS

| 3,659,895 A | 5/1972 | Dresden |
| 3,747,723 A | 7/1973 | Peterson et al. |
| 3,860,283 A | 1/1975 | Colautti |
| 3,868,084 A | 2/1975 | Quakenbush |
| 4,227,670 A | 10/1980 | Vander Burgh et al. |

(Continued)

FOREIGN PATENT DOCUMENTS

| DE | 4015966 A1 | 6/1991 |
| DE | 19612979 A1 | 10/1996 |

(Continued)

OTHER PUBLICATIONS

The Wise Company, Inc., "Wise Emergency Medical Seating", Website, http://wiseseats.com/wise_ems_home.html, Mar. 18, 2009, 13 pages.

(Continued)

*Primary Examiner* — Peter Brown
(74) *Attorney, Agent, or Firm* — Barnes & Thornburg LLP

(57) ABSTRACT

A vehicle seat assembly includes a seat, a pedestal, a swivel mechanism connected to the pedestal for permitting the seat to rotate about a vertical axis and a latch located external to the swivel mechanism for preventing rotation of the seat. The seat assembly may further include a bracket for mounting the seat to the swivel mechanism in any one of a plurality of positions. Another vehicle seat assembly includes a track, a seat having a seating portion and a seat back, a base connected to the seat and engaging the track so as to permit longitudinal movement of the seat along the track and a locking mechanism for retaining the seat in a desired position along the track. The locking mechanism includes a vertically extending pin located beneath the center of the seating portion of the seat.

23 Claims, 15 Drawing Sheets

(56) References Cited

U.S. PATENT DOCUMENTS

| | | | |
|---|---|---|---|
| 4,401,287 A | 8/1983 | Moeser | |
| 4,411,395 A | 10/1983 | Steffens | |
| 4,518,139 A * | 5/1985 | Barfell | 248/418 |
| 4,544,202 A | 10/1985 | Keaton | |
| 4,600,239 A | 7/1986 | Gerstein et al. | |
| 4,640,486 A | 2/1987 | Neville | |
| 4,705,256 A | 11/1987 | Hofrichter | |
| 4,834,452 A | 5/1989 | Goodrich | |
| 4,844,543 A * | 7/1989 | Ochiai | 297/344.26 |
| 4,971,392 A * | 11/1990 | Young | 297/256.12 |
| 5,082,328 A | 1/1992 | Garelick | |
| 5,161,765 A | 11/1992 | Wilson | |
| 5,183,312 A | 2/1993 | Nania | |
| 5,292,179 A | 3/1994 | Forget | |
| 5,380,062 A | 1/1995 | Nania | |
| 5,482,354 A * | 1/1996 | Gryp | 297/344.22 |
| 5,568,960 A | 10/1996 | Oleson et al. | |
| 5,584,460 A | 12/1996 | Ropp | |
| 5,599,065 A | 2/1997 | Gryp et al. | |
| 5,702,084 A * | 12/1997 | Carnahan et al. | 248/416 |
| 5,853,221 A | 12/1998 | Thorman et al. | |
| 5,904,399 A * | 5/1999 | Kim et al. | 297/344.21 |
| 6,021,989 A * | 2/2000 | Morita et al. | 248/349.1 |
| 6,260,920 B1 | 7/2001 | Tolfsen | |
| 6,536,842 B2 * | 3/2003 | Bowers et al. | 297/344.22 |
| 6,877,811 B1 | 4/2005 | Garelick | |
| 6,899,385 B2 | 5/2005 | Pernicka et al. | |
| 7,172,255 B2 | 2/2007 | Wanke | |
| 7,364,234 B2 | 4/2008 | Begin et al. | |
| 7,866,751 B2 * | 1/2011 | Downey | 297/344.24 |
| 2006/0108848 A1 * | 5/2006 | Williamson et al. | 297/344.24 |
| 2006/0170262 A1 | 8/2006 | Gold et al. | |
| 2007/0046089 A1 | 3/2007 | Begin et al. | |
| 2007/0052271 A1 * | 3/2007 | Lin et al. | 297/344.22 |
| 2008/0202177 A1 | 8/2008 | Abdella et al. | |
| 2008/0211287 A1 | 9/2008 | Lamparter et al. | |
| 2008/0231102 A1 | 9/2008 | Elio et al. | |
| 2009/0114793 A1 | 5/2009 | Brewer et al. | |
| 2009/0127908 A1 | 5/2009 | Kucharski et al. | |
| 2009/0236880 A1 | 9/2009 | Villeminey | |
| 2009/0322136 A1 | 12/2009 | Kazyak et al. | |

FOREIGN PATENT DOCUMENTS

| | | |
|---|---|---|
| EP | 0005908 A1 | 12/1979 |
| EP | 0546896 A1 | 6/1993 |
| GB | 2456697 A | 7/2009 |

OTHER PUBLICATIONS

Be-Ge Jany A/S, Untitled document, Website, http://www.jany.dk/produkter/hany/m1/saeder/862.htm, Mar. 19, 2009, 1 page.

Photographs of portions of a seat believed to be manufactured by Be-Ge Jany A/S, undated, 3 pages.

Jany, Type 862—the seat that disappears, undated, 1 page.

International Search Report, European Patent Office, Jul. 14, 2010, 3 pages.

* cited by examiner

VEHICLE SEAT ASSEMBLY

CROSS REFERENCE TO RELATED APPLICATION

This application is a divisional of U.S. patent application Ser. No. 12/752,250, filed Apr. 1, 2010, which claims priority from U.S. Provisional Patent Application Nos. 61/165,598, filed Apr. 1, 2009 and 61/309,185 filed Mar. 1, 2010.

BACKGROUND AND SUMMARY OF THE INVENTION

The present invention relates to a vehicle seat that may be swiveled about a vertical axis into one of a number of positions. The invention further relates to a vehicle seat that can be moved longitudinally along a track.

Various seats that can be rotated and/or moved longitudinally are known in the art. Examples of such seats are shown in U.S. Pat. Nos. 3,659,895, 3,860,283, 5,599,065, 5,853,221 and 6,877,811.

In one embodiment of the present invention, a vehicle seat assembly includes a seat, a pedestal, a swivel mechanism connected to the pedestal for permitting the seat to rotate about a vertical axis and a latch located external to the swivel mechanism for preventing rotation of the seat. The seat assembly may further include a bracket for mounting the seat to the swivel mechanism in any one of a plurality of positions. In one embodiment of the invention, the latch engages a portion of the swivel mechanism. The latch may rotate with the seat. In another embodiment of the invention, the seat assembly further includes a handle for operating the latch. The handle may rotate with the seat.

In another embodiment of the present invention, the swivel mechanism includes a bearing located adjacent the pedestal, a first collar located on the bearing and a second collar positioned over the bearing and at least a portion of the first collar. In one embodiment, the bracket mounts the seat to the first collar. In another embodiment, the second collar includes a plurality of notches for receiving a portion of the latch. In yet another embodiment of the present invention, the swivel mechanism further includes a plate positioned adjacent the second collar and a portion of the latch is received between the second collar and the plate.

In another embodiment of the present invention, a vehicle seat assembly includes a track, a seat having a seating portion and a seat back and a base connected to the seat. The base engages the track so as to permit longitudinal movement of the seat along the track. The seat assembly further includes a locking mechanism for retaining the seat in a desired position along the track. The locking mechanism includes a vertically extending pin located beneath the center of the seating portion of the seat. The pin may engage a portion of the track. The vehicle seat assembly may further include a swivel mechanism connected to the base for permitting the seat to rotate about a vertical axis.

DETAILED DESCRIPTION OF THE PREFERRED EMBODIMENTS

Figure 1:
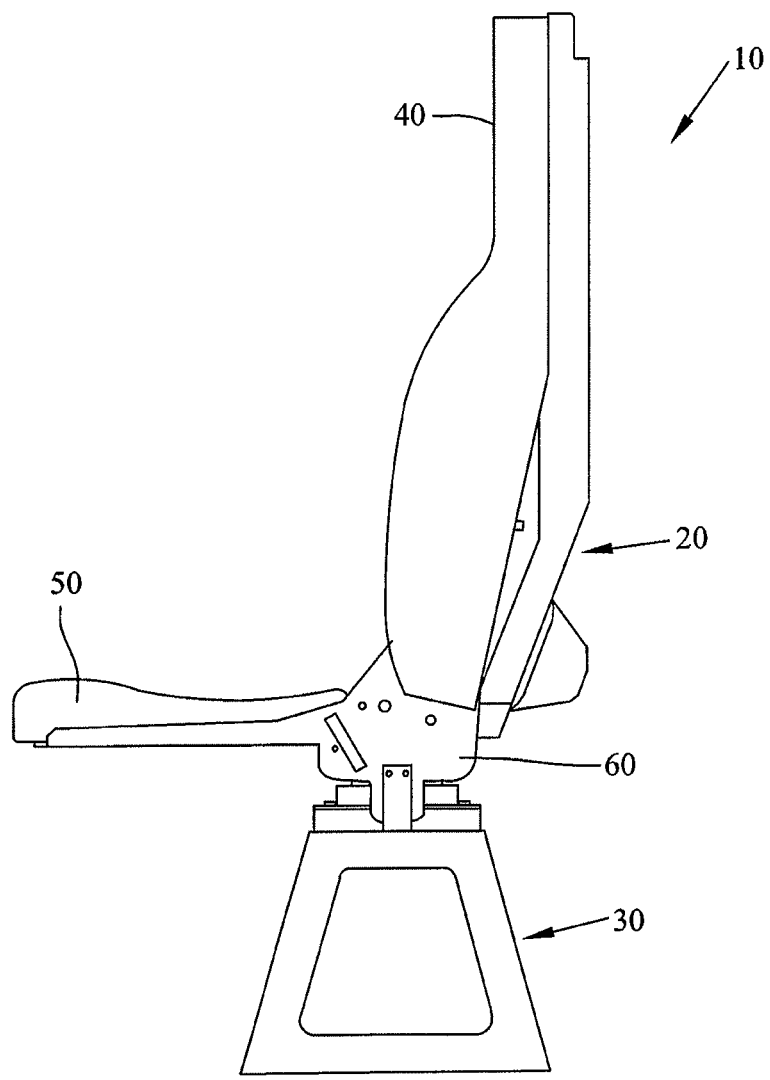
FIG. 1 is a side plan view of a vehicle seat assembly according to one embodiment of the present invention.

FIG. 1 is a side plan view of a seat assembly 10 according to one embodiment of the present invention. Seat assembly 10 generally includes a seat 20 and a base 30. Seat 20 generally includes a seat back 40, a seating portion 50 and a mounting bracket 60.

Figure 3:
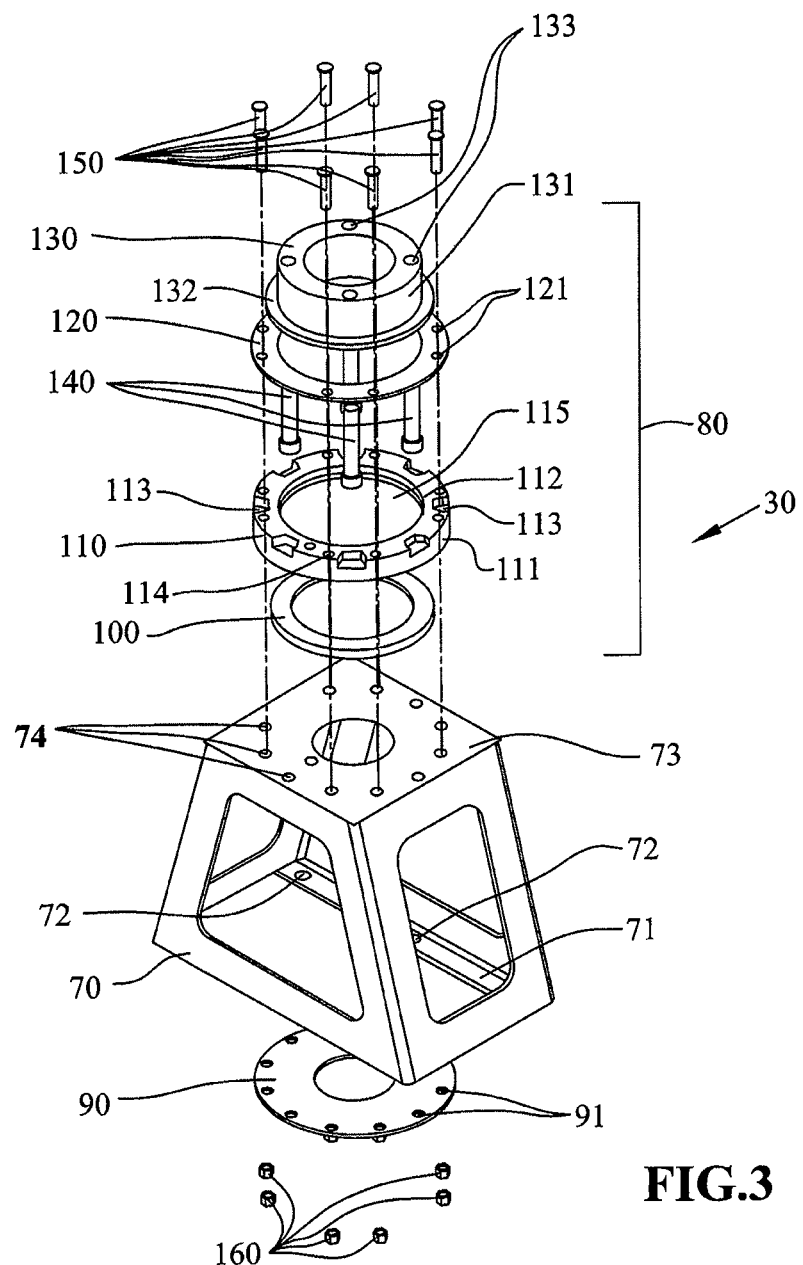
FIG. 3 is an exploded perspective view of a base that is a component of the vehicle seat assembly shown in FIG. 1.

Turning to FIG. 3, base 30 generally includes a pedestal 70, a swivel mechanism generally indicated as 80 and a reinforcing plate 90. In the embodiment shown, pedestal 70 includes flanges 71 having openings 72 therein for securing pedestal 70 to a vehicle floor or other location. Pedestal 70 further includes an upper surface 73 with a plurality of openings 74 therein for securing swivel mechanism 80 and reinforcing plate 90 to pedestal 70 as described herein.

Swivel mechanism 80 generally includes a bearing 100, an outer collar 110, an outer collar cover plate 120, an inner collar 130, a plurality of bolts 140 and a plurality of bolts 150 and corresponding nuts 160. Bearing 100 is a generally annular member that sits on surface 73 of pedestal 70 and within outer collar 110 as described below.

Outer collar 110 is a generally annular shaped member having a substantially perpendicular outer wall 111 and a substantially horizontal lip 112 defining an opening 115. Outer collar 110 further includes a plurality of notches 113 for receiving a latching mechanism as described herein. Outer collar 110 also includes a plurality of openings 114 for receiving bolts 150 as described herein.

Outer collar cover plate 120 is a substantially annular member having substantially the same inner diameter and outer diameter as lip 112 of outer collar 110. Outer collar cover plate 120 further includes a plurality of openings 121 for receiving bolts 150 as described below.

Inner collar 130 is a substantially annular member including a substantially cylindrical portion 131 with a flange 132 extending therefrom. Cylindrical portion 131 and flange 132 are sized and configured such that portion 131 extends through opening 115 of outer collar 110 and flange 132 extends below lip 112 of outer collar 110 as described below. Inner collar 130 further includes a plurality of openings 133 for receiving bolts 140 for securing seat 20 to pedestal 70 and swivel mechanism 80 as described below. Reinforcing plate 90 includes a plurality of openings 91 for receiving bolts 150 as described below.

To assemble base 30, bolts 140 are inserted through openings 131 of inner collar 130. Bearing 100 is positioned on surface 73 and flange 132 of inner collar 130 is positioned on bearing 100. Outer collar 110 is positioned over bearing 100 and inner collar 130 such that bearing 100 and flange 132 are located within outer wall 111 and under lip 112. Outer collar cover plate 120 is positioned over lip 112 of outer collar 110 and bolts 150 are inserted through openings 121, 114, 74 and 91 and secured with nuts 160. In this manner, reinforcing plate 90, outer collar 110 and outer collar cover plate 120 are stationary with respect to pedestal 70 and upper surface 73 while bearing 100 and inner collar 130 are secured to pedestal 70 and free to rotate with respect thereto and with respect to surface 73.

Figure 4:
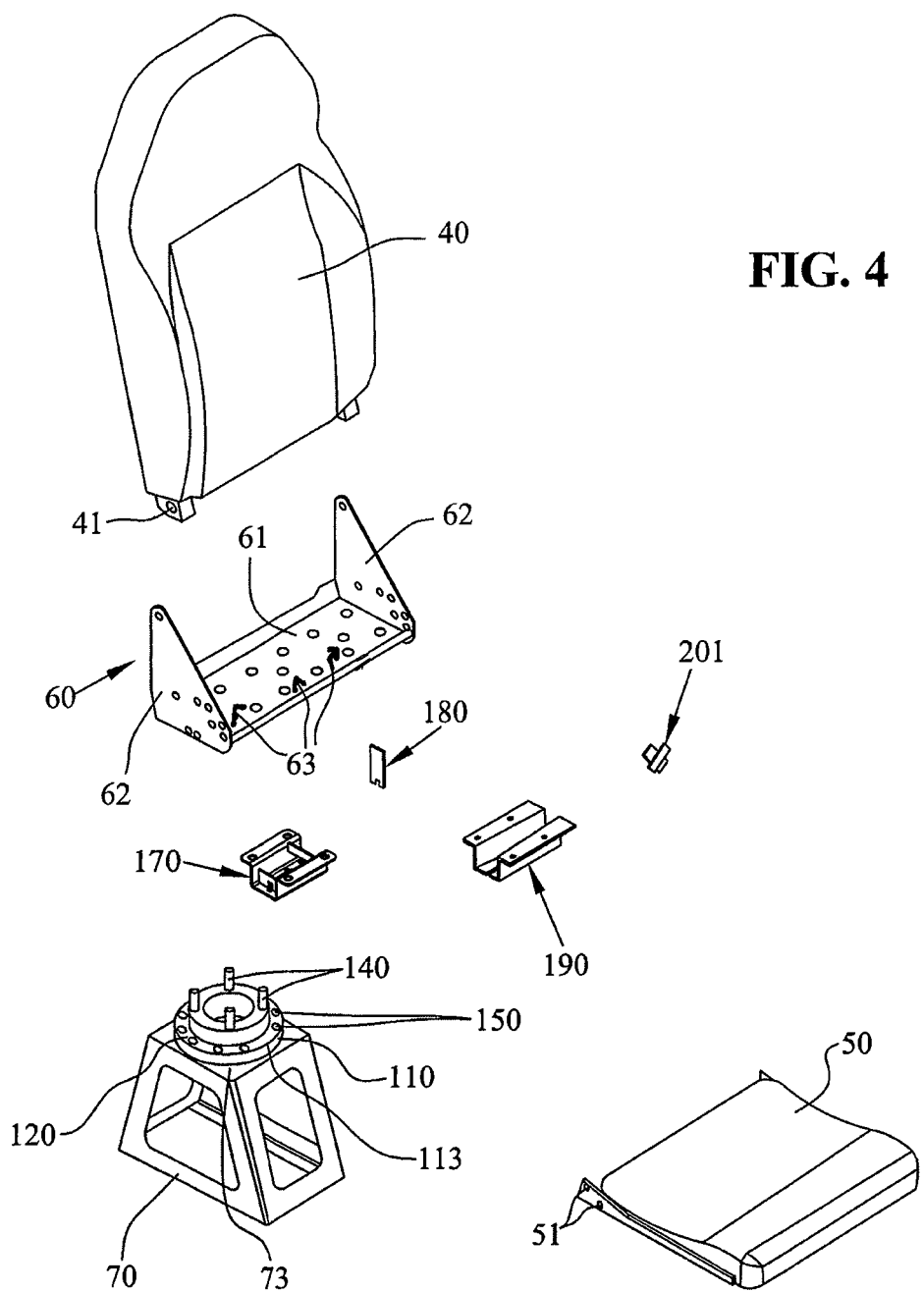
FIG. 4 is an exploded perspective view of a seat and latch assembly positioned above the base, all of which are components of the vehicle seat assembly shown in FIG. 1.

Turning to FIG. 4, bracket 60 includes a first member 61 for securing bracket 60 to base 30 as described below and two vertical members 62 for securing seat back 40 and seating portion 50 to bracket 60. Seat back 40 includes two openings 41 (one of which is shown) for aligning with corresponding openings in bracket 60 and receiving fasteners to secure back 40 to bracket 60. Similarly, seating portion 50 includes a plurality of openings 51 which align with corresponding openings in bracket 60 to receive fasteners for securing seating portion 50 to bracket 60. Bracket 60 further includes three sets of openings 63 for securing bracket 60 (and, therefore, seat 20) to base 30 as described below. Bracket 60 further includes additional openings for securing latch assembly 170, cable release bracket 180, cable cover plate 190 and actuator bracket 200 to base 60.

Figure 5:
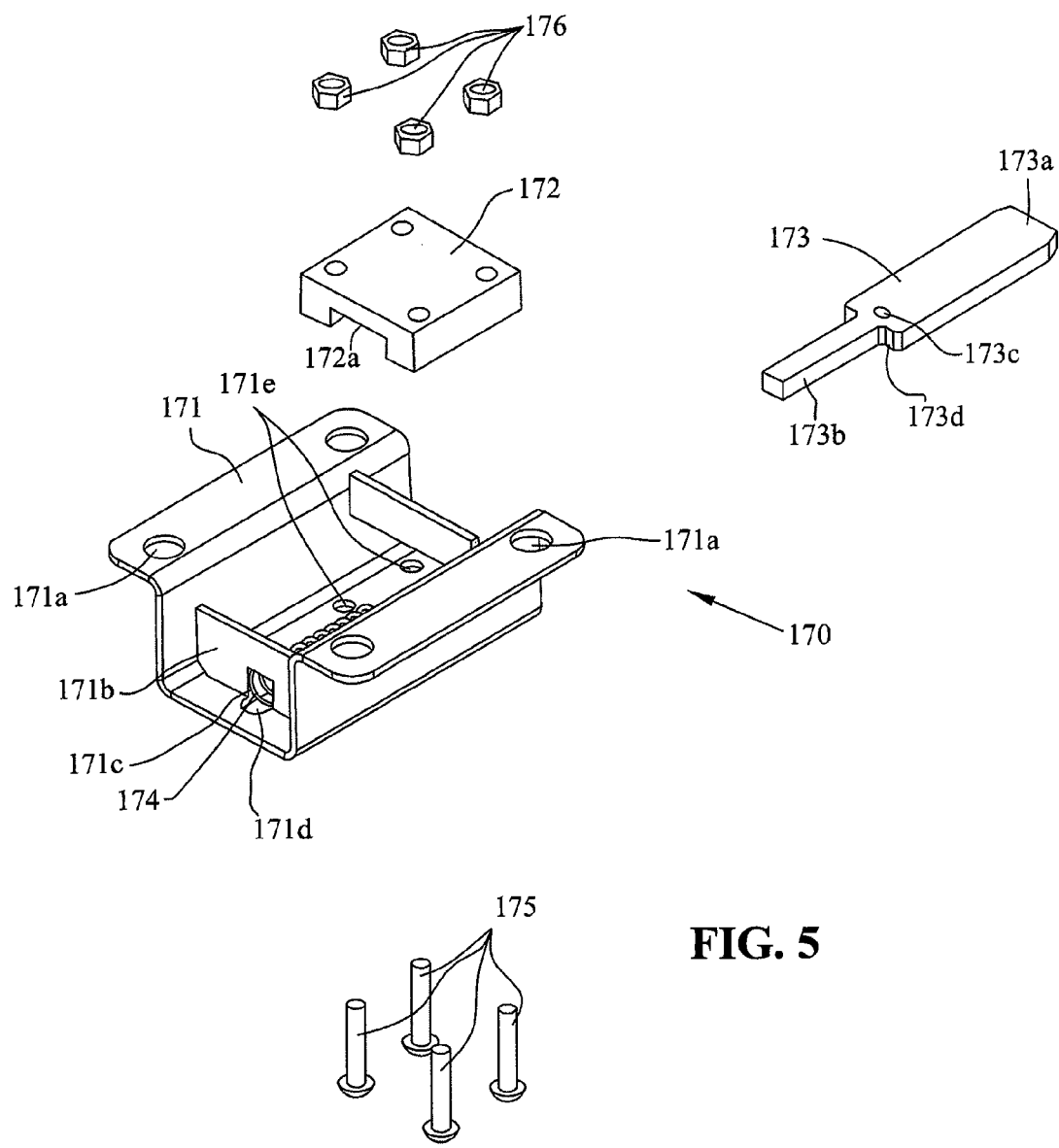
FIG. 5 is a perspective view of a latch assembly that is a component of the vehicle seat assembly shown in FIG. 1.

Turning to FIG. 5, latch assembly 170 generally includes a support bracket 171, a guide 172, a pin 173, a spring 174 and bolts 175 with corresponding nuts 176. Bracket 171 includes a plurality of openings 171a for receiving fasteners (not shown) to secure latch assembly 170 to bracket 60. Bracket 171 further includes a first wall 171b having an opening 171c therein. Bracket 171 also includes an opening or slot 171d in the lower face thereof and openings 171e for receiving bolts 175 to secure guide 172 thereto. In the embodiment shown, guide 172 is a generally c-shaped member including a slot or channel 172a therein for receiving pin 173. Pin 173 includes, in the embodiment shown, a first tapered end 173a, a narrower second end 173b and an opening 173c. A shoulder 173d is located at the transition between the first and second ends of pin 173.

To assemble latch assembly 170, pin 173 is positioned in bracket 171 such that end 173b extends into spring 174. Guide 172 is positioned over pin 173 such that pin 173 is located in slot 172a. Bolts 175 and nuts 176 are used to secure guide 172 to bracket 171. In this manner, spring 174 is compressed between wall 171b of bracket 170 and shoulder 173d of pin 173. In this fashion, end 173a of pin 173 is biased away from wall 171b.

Figure 6:
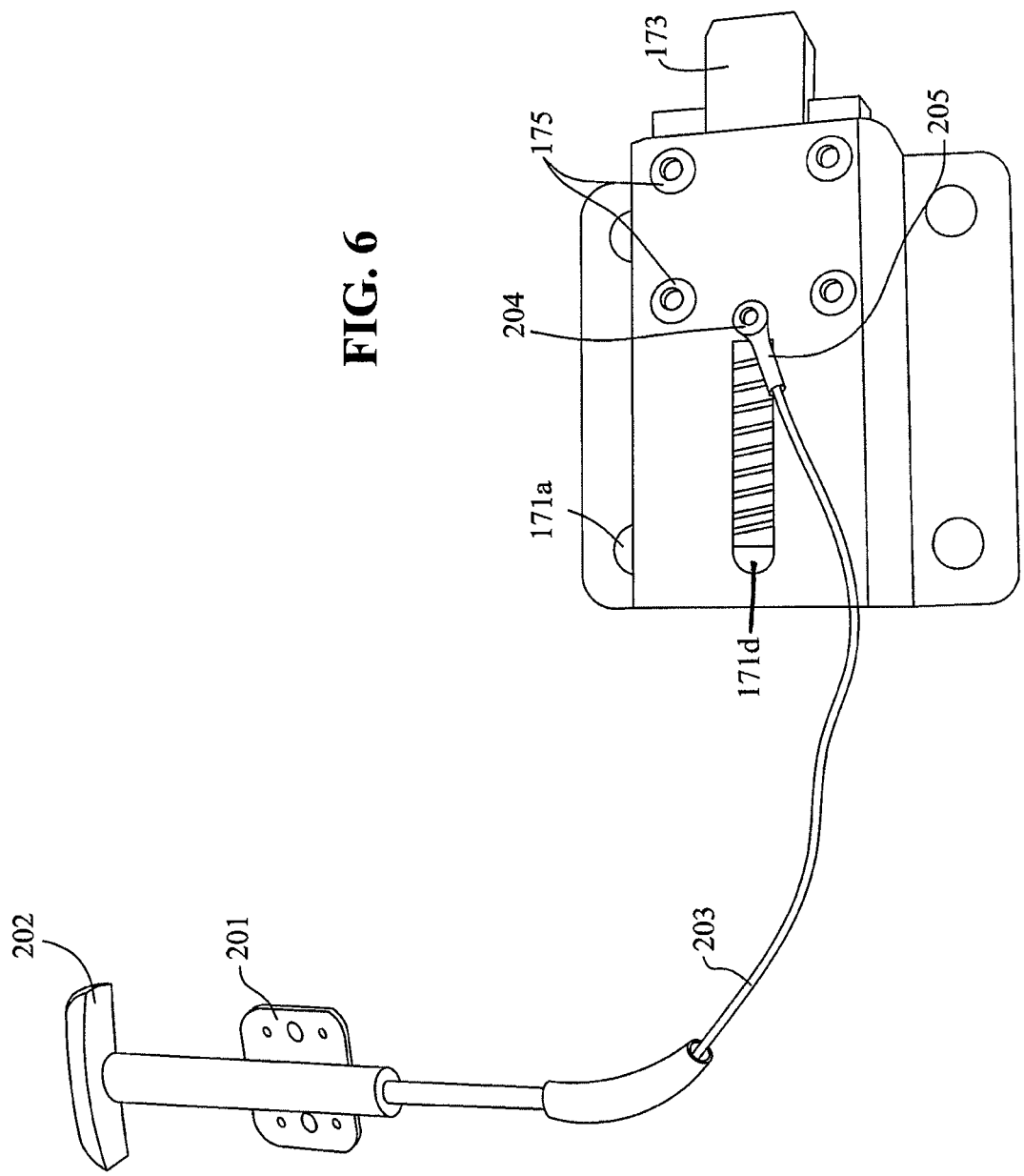
FIG. 6 is a perspective view of the latch assembly and an actuator according to one embodiment of the present invention that are components of the vehicle seat assembly shown in FIG. 1.

FIG. 6 shows latch assembly 170 connected to actuator 200. Actuator 200 generally includes a bracket 201 for securing actuator 200 to bracket 60. Actuator 200 further includes a handle 202 connected to a cable 203 for actuating pin 173. The end of cable 203 opposite handle 202 is connected to pin 173 by inserting a fastener 204 through a connector 205 on cable 203 and through opening 171d in bracket 171 and into opening 173c of pin 173. In this manner, when actuator 200 and latch assembly 170 are secured to bracket 60, latch 170 may be actuated by pulling on handle 202 which in turn draws pin 173 toward wall 171b of bracket 171, thereby compressing spring 174. When handle 202 is released, spring 174 urges pin 173 in the opposite direction to engage a notch 113 in outer collar 110, as described below.

Figure 7:
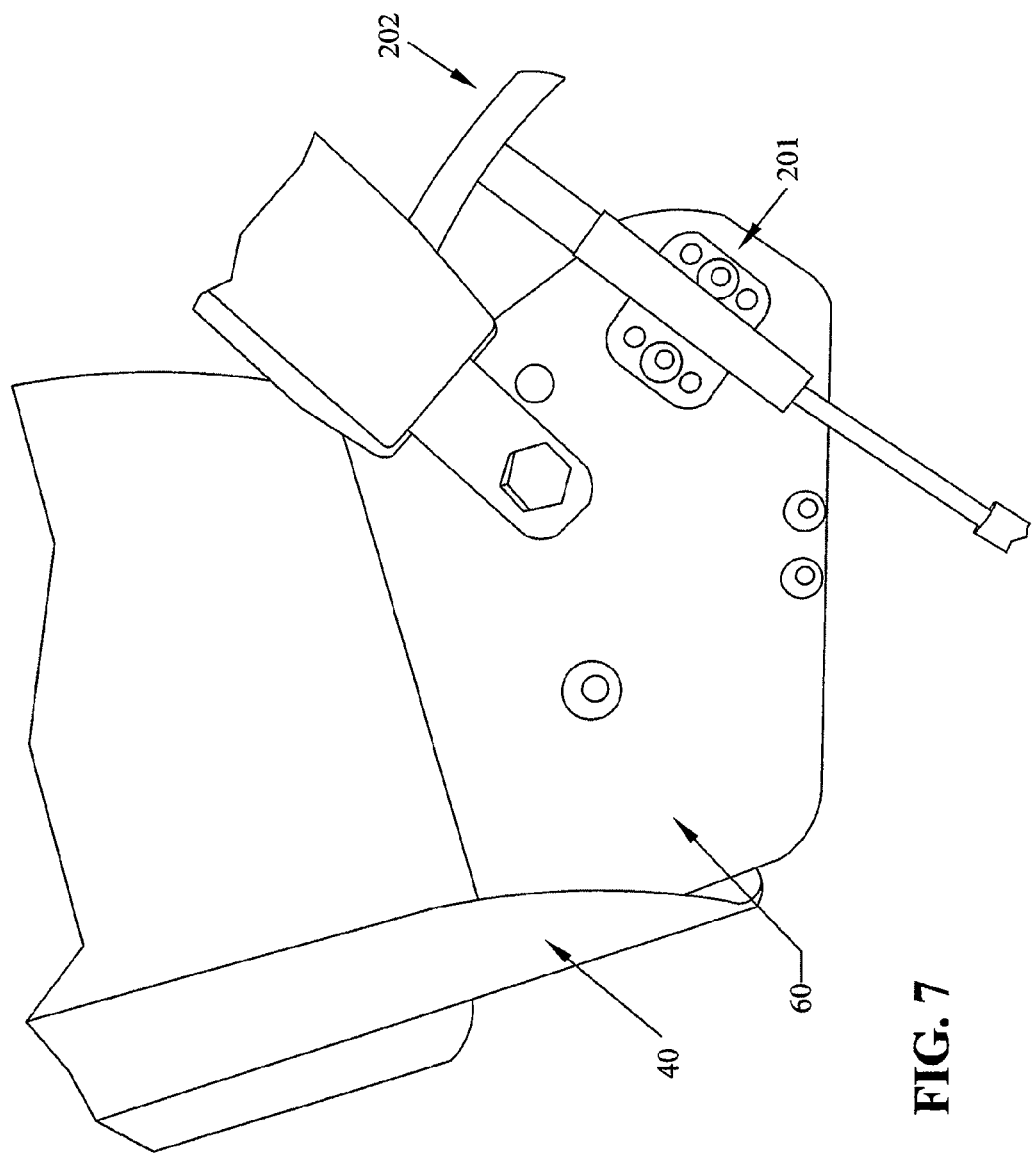
FIG. 7 is a side plan view of a portion of the seat shown in FIG. 1 with the actuator assembly attached thereto.
Figure 8:
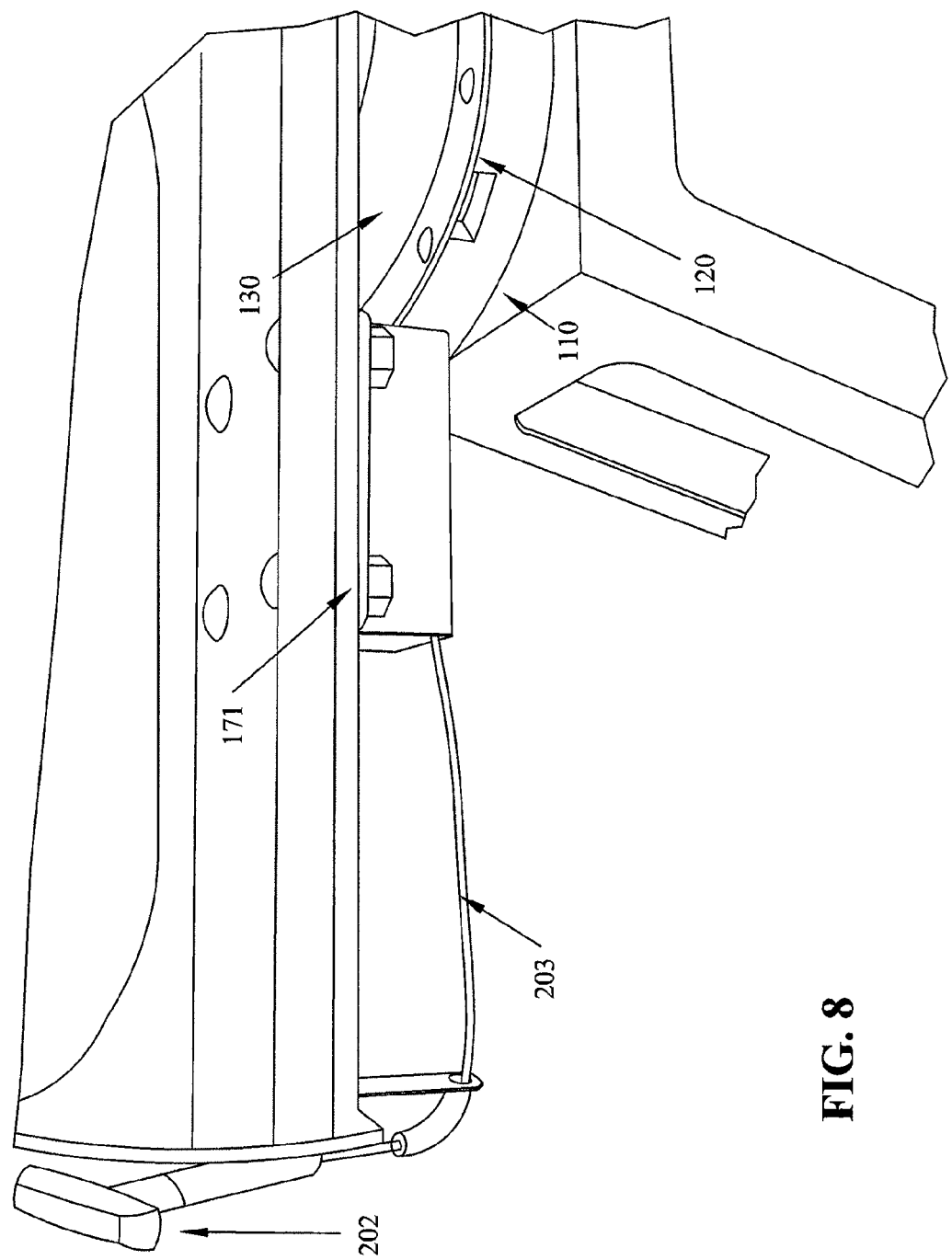
FIG. 8 is a front perspective view of a portion of the vehicle seat assembly shown in FIG. 7 with the actuator and latch assembly attached thereto.
Figure 9:
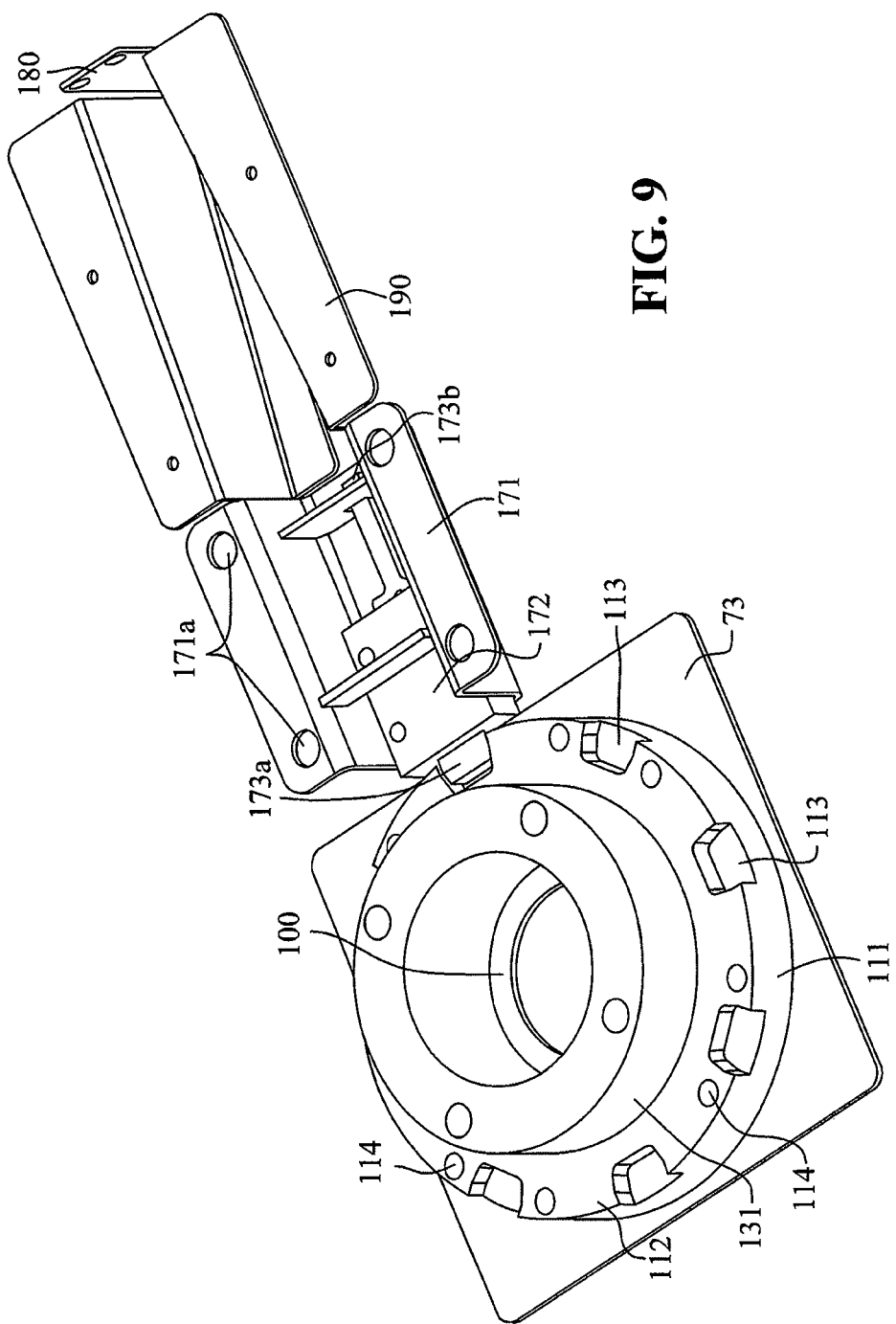
FIG. 9 is a perspective view of the latch assembly engaging a portion of the seat base and further including a cable cover.

FIGS. 7 and 8 show actuator 200 and latch assembly 170 secured to bracket 60 such that latch assembly 170 is positioned adjacent swivel mechanism 80. In the view shown in FIG. 8, pin 173 extends into a notch 113 in outer collar 110. This arrangement is illustrated in FIG. 9 in which outer collar cover plate 120 has been removed for clarity. FIG. 9 also shows the position of cable cover plate 190, which is not included in FIG. 8 for clarity. Note that spring 174 has likewise been removed from FIG. 9 for clarity.

Figure 2:
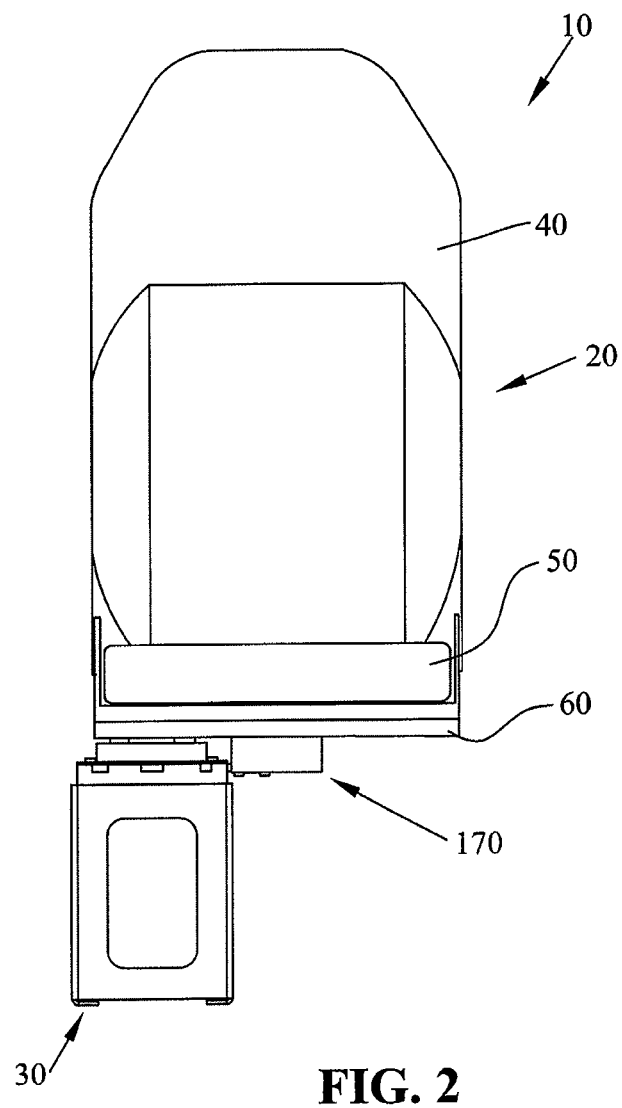
FIG. 2 is a front plan view of the vehicle seat assembly shown in FIG. 1.

Seat 20 is attached to pedestal 70 and swivel assembly 80 by locating a group of holes 63 in bracket 60 over fasteners 140 and securing with nuts or other appropriate fasteners. By selecting the desired set of openings 63, seat 20 can be positioned on base 30 in any one of a plurality of positions. For example, as shown in FIG. 2, seat 20 is positioned on base 30 toward the left end of bracket 60. In this position, latch assembly 170 is positioned near the center of bracket 60 such that end 173a of pin 173 extends to the left so that it can engage notches 113 in outer collar 110. Alternatively, bracket 60 could be positioned such that grouping of openings 63 toward the right end thereof engage base 30. If so, latch assembly 170 would be turned such that end 173a of pin 173 extends toward the right. As yet another alternative, bracket 60 could be positioned such that openings 63 near the center thereof engage the base 30. In such an arrangement, latch 170 could be placed on either the right or left side of swivel assembly 80, as long as it is properly positioned so that pin 173 can engage notches 113.

To rotate seat 20, the occupant pulls handle 202 to release pin 173 from the notch 113 with which it is engaged and rotates the seat to the desired position with pin 173 aligned with a different notch 113. Handle 202 may then be released so that spring 174 urges end 172a of pin 173 into the newly selected notch 113. The engagement of pin 173 with notch 113 prevents further rotation of seat 20. Note that because actuator assembly 200 and latch assembly 170 maintain a fixed position with respect to seat 20 and rotate therewith, latch assembly 170 can always be actuated by the user from the same location regardless of the angular position of seat 20 with respect to base 30.

Because seat 20 can be positioned in any one of a number of locations with respect to base 30 and further because seat 20 can be pivoted to any one of a number of locations with respect to base 30, the present invention provides substantial flexibility with respect to use of seating assembly 10. For example, in the position shown in FIG. 2, base 30 could be positioned adjacent the wall of a vehicle, such as a van or emergency vehicle, and utilized in the position shown. When not needed for an occupant, seating portion 50 can be folded up against back 40 and seat 20 can be pivoted to face the side wall, thereby creating additional usable space within the vehicle. Note that seat 20 can also be configured such that back 40 folds down horizontally against seating portion 50.

Figure 10:
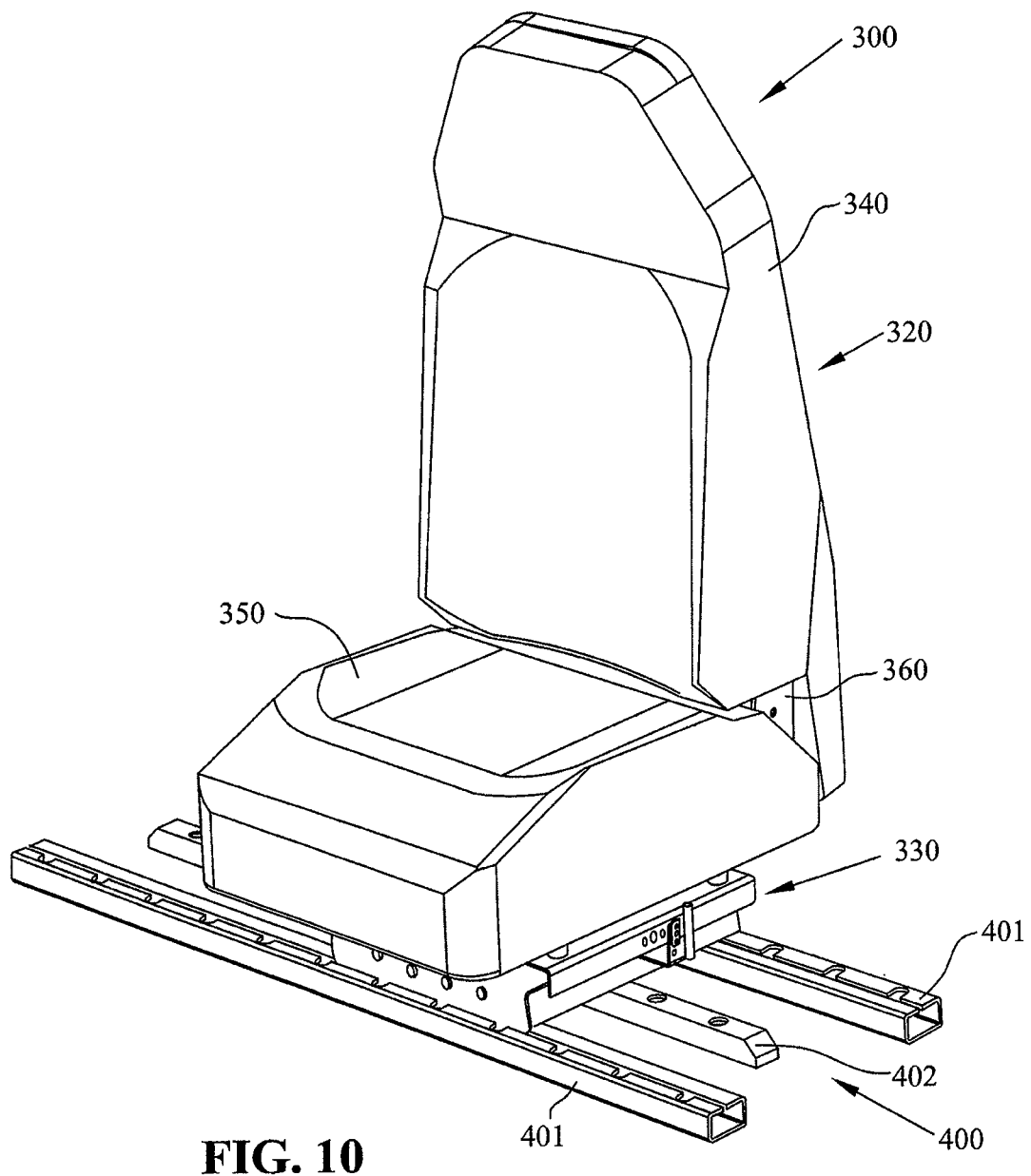
FIG. 10 is a perspective view of a vehicle seat assembly according to another embodiment of the present invention.

FIG. 10 is a perspective view of a vehicle seat assembly according to another embodiment of the present invention. Seat assembly 300 generally includes a seat 320 and a base 330. Seat 320 generally includes a seat back 340, a seating portion 350 and a mounting bracket 360. In this embodiment, base 330 engages track system 400 as described below. Track system 400 includes two outer tracks 401 and an inner track 402.

Figure 11:
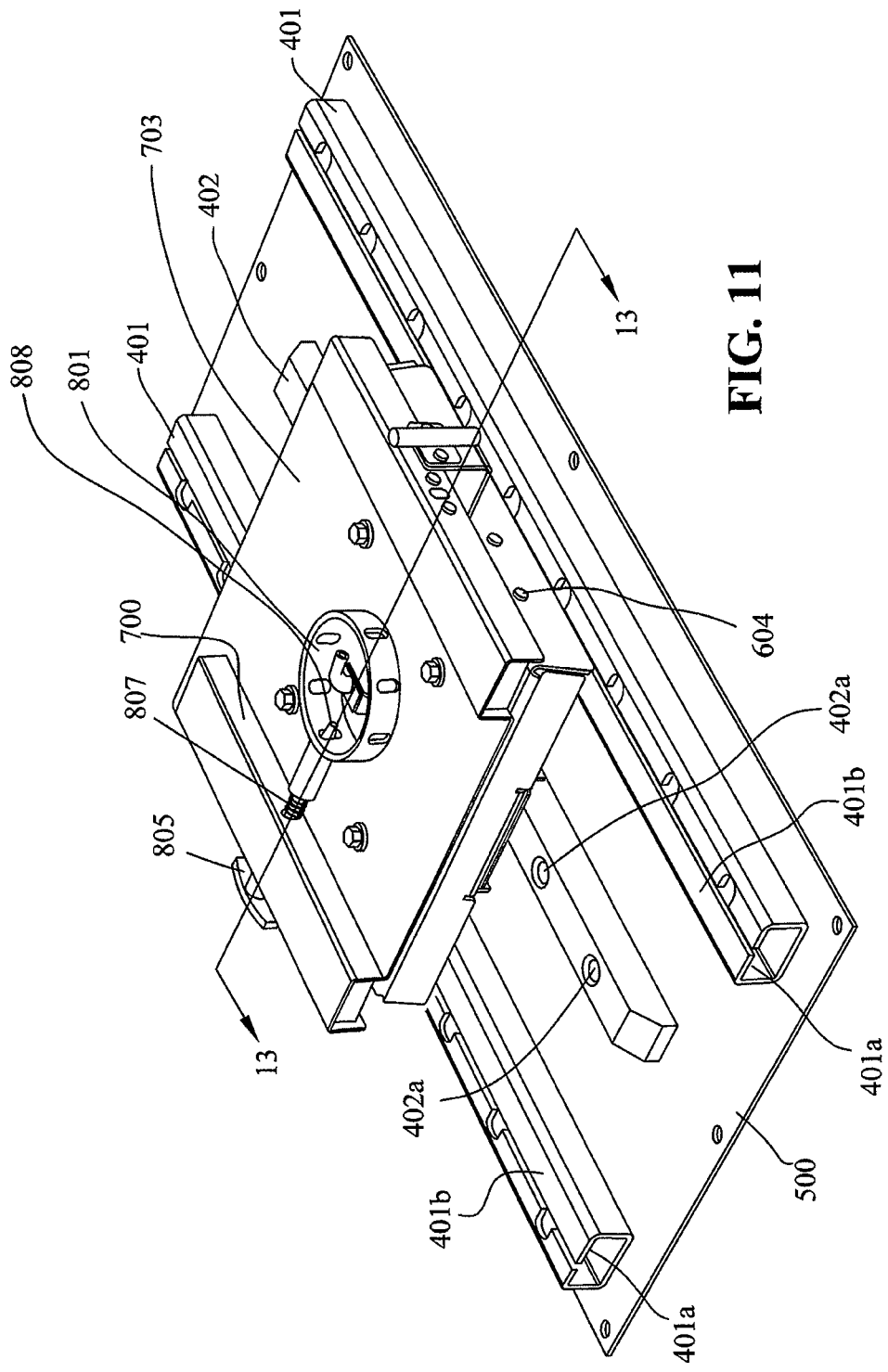
FIG. 11 is a perspective view of the base and track system that are components of the vehicle seat assembly of FIG. 10.
Figure 12:
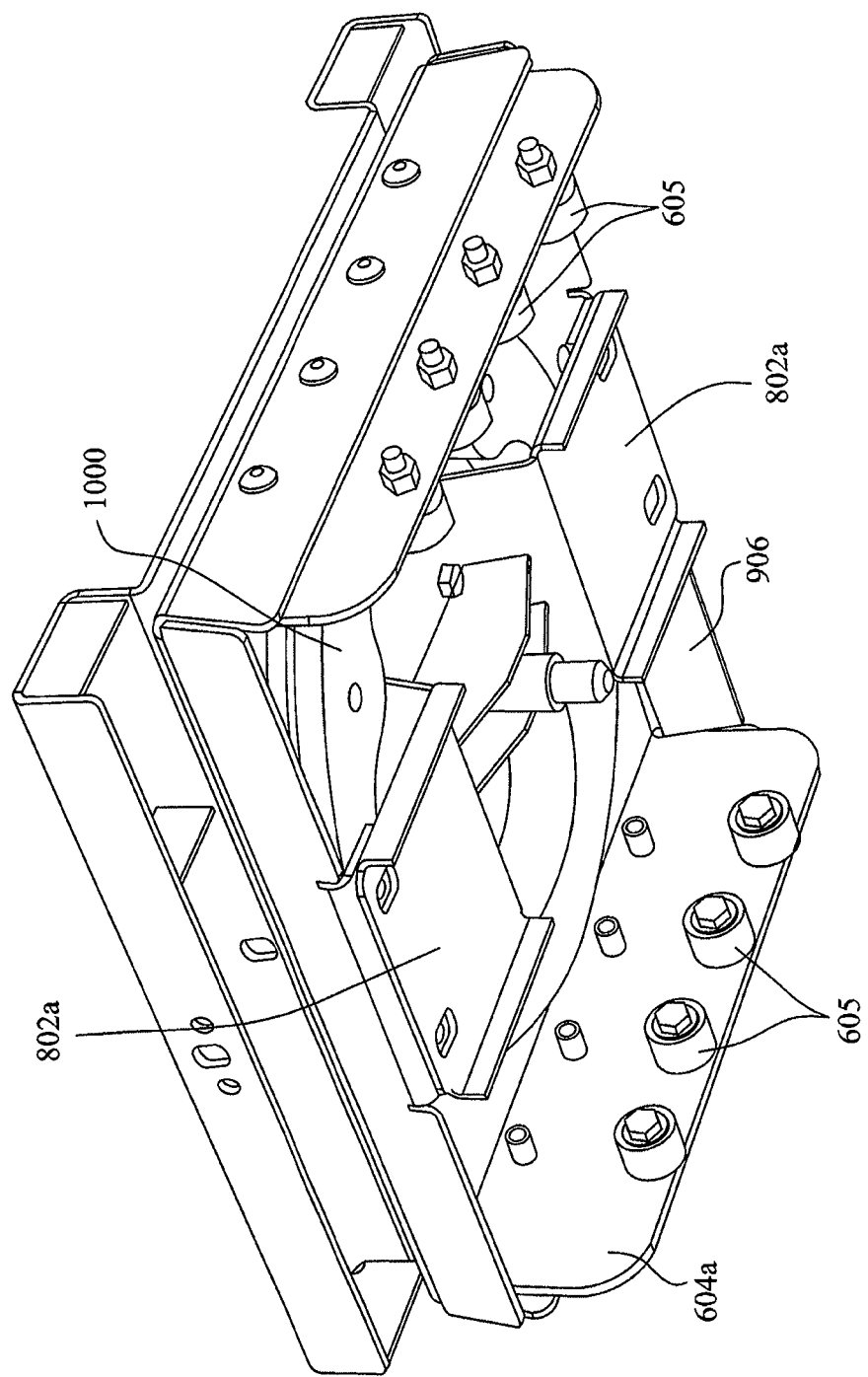
FIG. 12 is a bottom perspective view of the base shown in FIG. 11.
Figure 13:
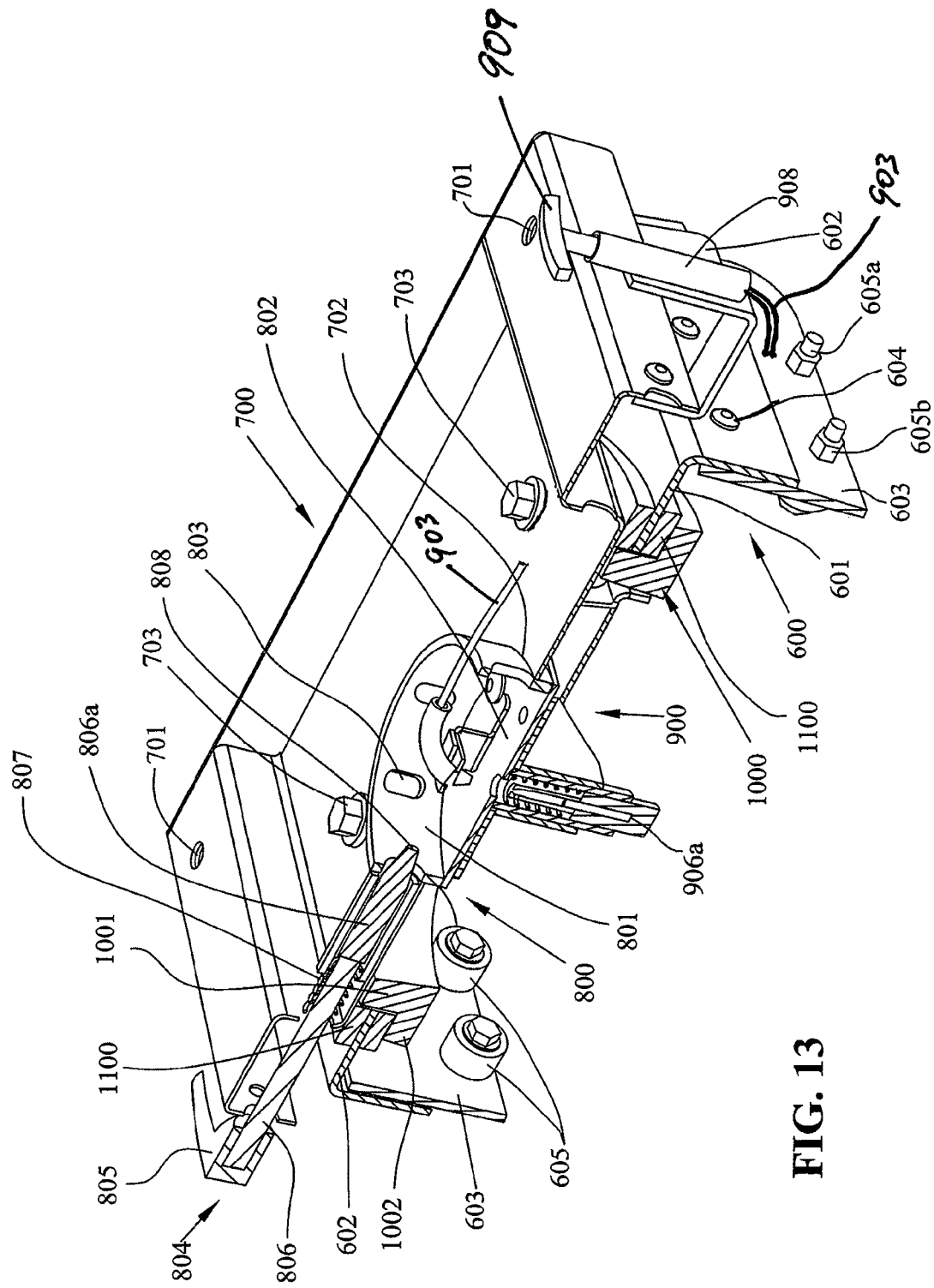
FIG. 13 is a cross sectional view of the base shown in FIG. 11 taken along line 13-13.
Figure 14:
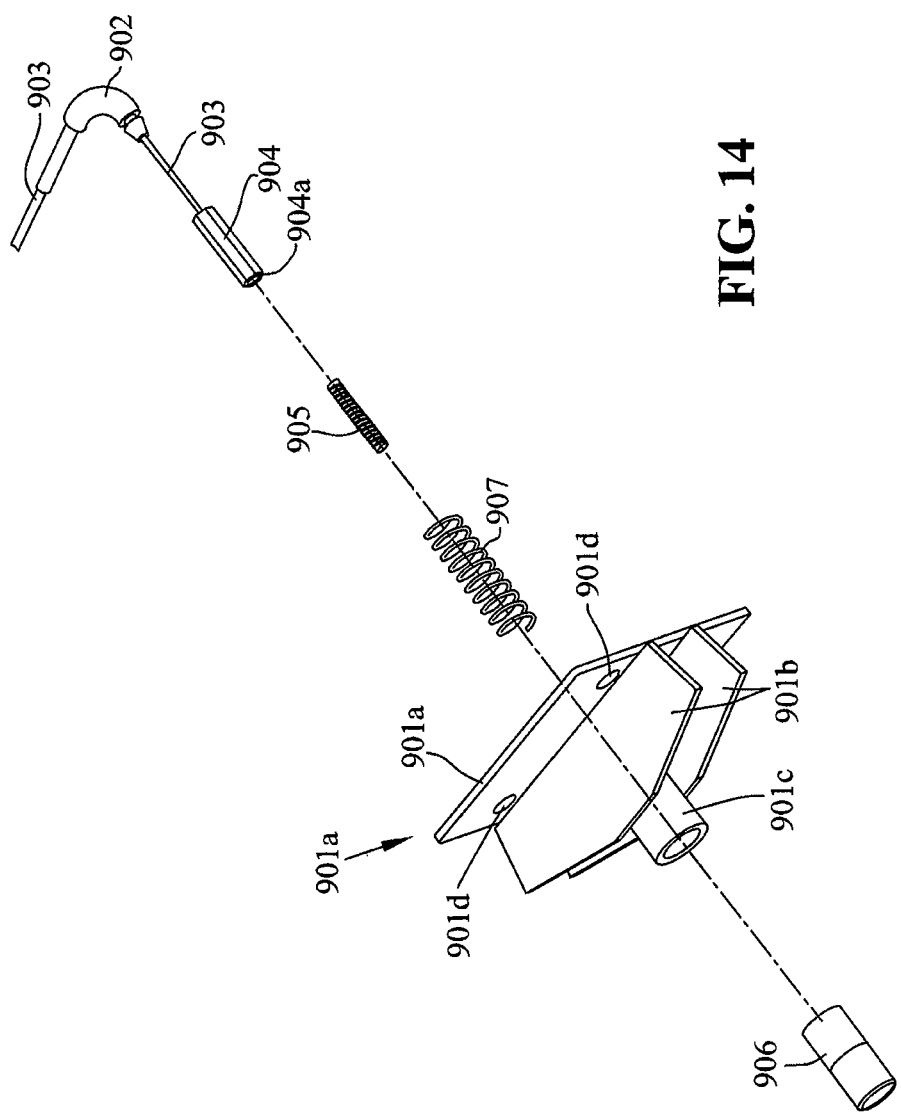
FIG. 14 is an exploded perspective view of a longitudinal locking mechanism that is a component of the vehicle seat assembly of FIG. 10.

Turning to FIGS. 11-13, base 330 is shown with seat 320 removed. As seen in FIG. 11, track system 400 is mounted to a plate 500 that is in turn mounted to a floor or floor support structure. In one embodiment, plate 500 is mounted to a vehicle floor or floor support structure. Base 330 generally includes a support structure 600, a seat mounting plate or bracket 700, a rotational locking or latching mechanism 800 and a longitudinal locking or latching mechanism 900.

Support structure 600, in the embodiment shown, includes a substantially planar plate or bracket 601 having substantially vertically depending flanges 602 extending downwardly therefrom on opposite sides. Support structure 600 further includes a pair of roller supports or carriers 603 secured to flanges 602 by screws or other fasteners 604. Roller supports 603 each include one or more rollers 605 rotatably attached thereto. In the embodiment shown, rollers 605 are secured to supports 603 by bolts 605a extending therethrough and secured with nuts 605b in a conventional fashion. Note that rollers 605 could be secured to support 603 in other manners provided that rollers 605 are generally free to rotate. Note as well that supports 603 could be eliminated and rollers 605 could be secured directly to flanges 602.

Seat mounting plate or bracket 700 includes a plurality of openings 701 for receiving bolts or other fasteners used to secure seat 320 to bracket 700. Bracket 700 includes a generally central opening 702 to accommodate a portion of rotational latching mechanism 800 as described below. Bracket 700 further includes a plurality of openings (not shown) through which bolts or other fasteners 703 extend to secure bracket 700 to a reinforcing collar 1000 as shown. In the embodiment shown, the reinforcing collar 1000 includes a generally vertically extending portion 1001 with a generally horizontally extending flange 1002 extending outwardly therefrom. A pair of annular bearings 1100 are also provided, one positioned between flange 1002 and bracket 601 and the other positioned between bracket 700 and bracket 601.

Rotational latching or locking mechanism 800 in the embodiment shown includes a collar 801 fixedly secured to support structure 600 via plate 802. Plate 802 is connected to support structure 600 through a pair of laterally extending sections 802a as shown in FIG. 12. Collar 801 includes a plurality of openings 803. Locking mechanism 800 further includes a latch mechanism 804 generally including a handle portion 805 and an elongated portion 806 extending therefrom toward collar 801. Mechanism 804 is supported on and carried by bracket 700 and rotates therewith, as described in greater detail below. In the embodiment shown, elongated portion 806 includes an expanded diameter portion 806a that traps a spring 807 between expanded portion 806a and a portion of bracket 700 as shown. Spring 807 urges elongated portion 806 toward collar 801 such that when end 808 of elongated portion 806 is generally aligned with an opening 803 in collar 801 end 808 will be urged into the opening, thereby preventing rotation of bracket 700 and seat 320.

In the embodiment shown, base 330 is positioned on track system 400 such that rollers 805 are positioned within outer tracks 401 and engage the inner, upper surfaces 401a thereof. Bearing members 604a are positioned on fasteners 604 and ride along the upper surface 401b of outer tracks 401. In this manner, base 330 can move longitudinally along track system 400.

Figure 15:
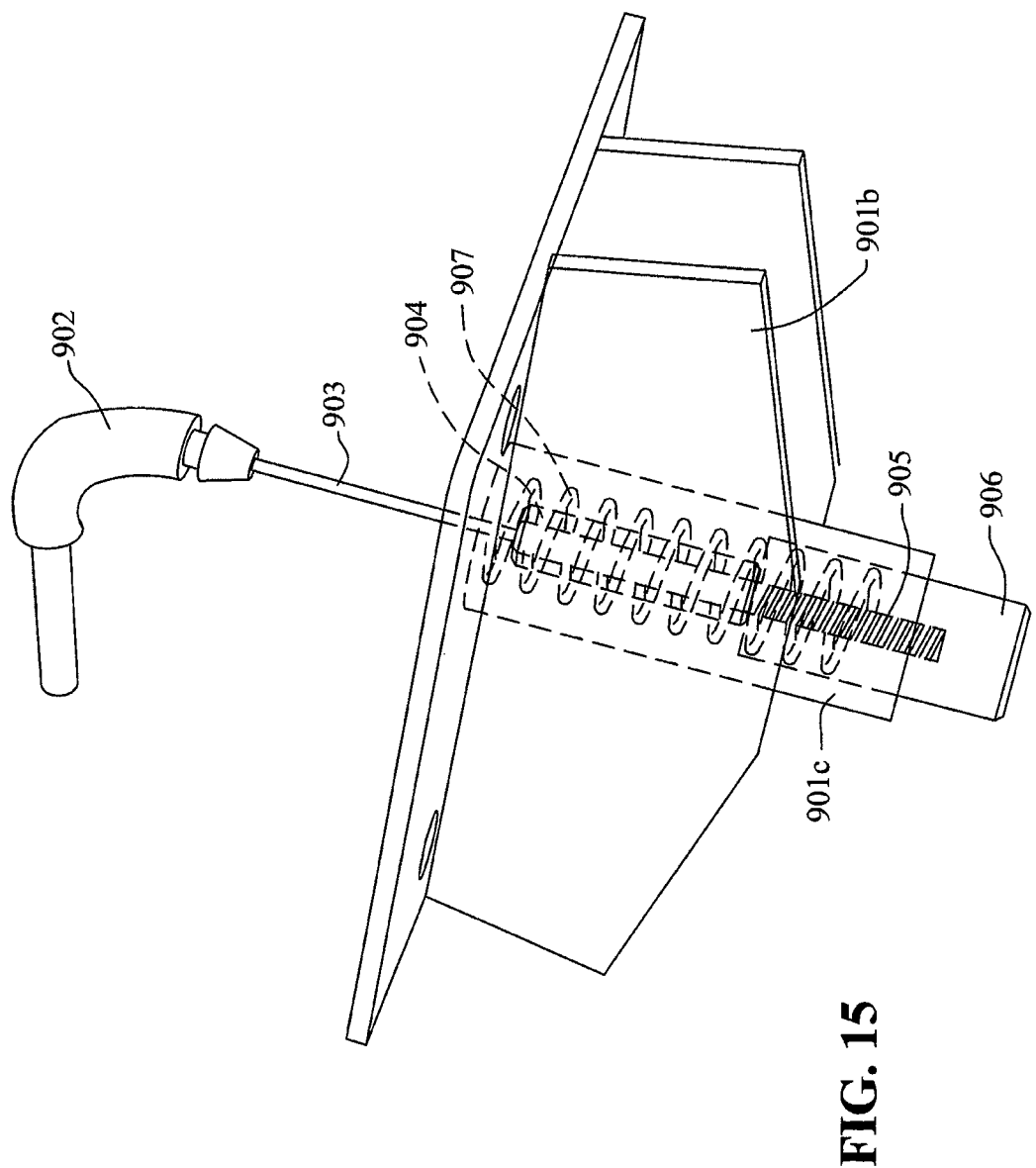
FIG. 15 is a perspective view of the locking mechanism of FIG. 14.

Longitudinal locking mechanism 900 generally includes a bracket 901 having a plate 901a with a pair of flanges 901b and a cylindrical member 901c depending therefrom. Plate 901a includes a plurality of openings 901d for receiving fasteners that secure bracket 901 to plate 802 as shown. Mechanism 900 further includes a right angle fitting 902 through which a cable 903 extends. Cable 903 is secured to a fitting 904 which includes an internally threaded bore 904a for engaging a set screw 905. Set screw 905 also engages an internally threaded bore 906a in pin 906. As shown in FIGS. 13 and 15, a spring 907 is trapped between plate 802 and pin 906. Spring 907 urges pin 906 downward. Cable 903 extends through fitting 902 and outwardly through a guide 908 where it connects to handle 909.

In use, pin 906 engages an opening 402a in center track 402. This engagement prevents base 330, and therefore seat 320, from moving longitudinally. In order to move seat 320 along track system 400, the user pulls handle 909, which it in turn causes cable 903 to pull pin 906 upwardly. After pin 906 clears openings 402a, seat 320 may be moved longitudinally. When the desired longitudinal position is obtained, handle 909 is released and pin 906 moves downwardly under the force of spring 907 and engages an opening 402a. Note that both rotational latching mechanism 800 and longitudinal latching mechanism 900 move with seat 320. In this manner, handles 805 and 909 are always in the same relative position with respect to the seat occupant.

Although the present invention has been shown and described in detail the same is to be taken by way of example only and not by way of limitation. Numerous changes can be made to the embodiments shown without departing from the scope of the invention. The present invention may be further modified within the spirit and scope of this disclosure. The application is, therefore, intended to cover any variations, uses, or adaptations of the invention using its general principles. Further, this application is intended to cover such departures from the present disclosure as come within known or customary practice in the art to which this invention pertains.

What is claimed is:

1. A vehicle seat assembly, including:
   a seat;
   a pedestal;
   a swivel mechanism connected to the pedestal for permitting the seat to rotate about a vertical axis, the swivel mechanism including a plurality of notches;
   a latch located external to the swivel mechanism, the latch including a portion operable to selectively engage one or more of the notches to prevent rotation of the seat; and
   a bracket connected to the seat, the bracket including a first plurality of openings for selectively and removably securing the seat to the swivel mechanism at a first location on the bracket in a first position relative to the pedestal and a second plurality of openings for selectively and removably securing the seat to the swivel mechanism at a second location on the bracket in a second position relative to the pedestal wherein the seat and bracket may be dismounted from one of the first and second plurality of openings and reattached to the swivel mechanism at the other of the first and second plurality of openings.

2. The vehicle seat assembly according to claim 1, further including means connected to the seat for operating the latch.

3. The vehicle seat assembly according to claim 2, wherein the means for operating the latch is a handle that rotates with the seat.

4. The vehicle seat assembly according to claim 1, wherein the bracket includes a first end and a second end and the first location is adjacent the first end of the bracket and the second location is adjacent the second end of the bracket.

5. The vehicle seat assembly according to claim 1, wherein the bracket further includes a third plurality of openings for selectively and removably securing the seat to the swivel mechanism at a third location on the bracket in a third position relative to the pedestal.

6. The vehicle seat assembly according to claim 5, wherein the bracket includes a first end and a second end and the third location is located between the first and second ends of the bracket.

7. The vehicle seat assembly according to claim 1, wherein the bracket includes a first end, a second end, a third plurality of openings for selectively and removably securing the seat to the swivel mechanism at a third location on the bracket in a third position relative to the pedestal, the first location is adjacent the first end of the bracket, the second location is adjacent the second end of the bracket and the third location is located between the first and second locations.

8. A vehicle seat assembly, including:
 a seat;
 a pedestal;
 a swivel mechanism connected to the pedestal for permitting the seat to rotate about a vertical axis, the swivel mechanism including a bearing located adjacent the pedestal, a first collar located on the bearing and a second collar positioned over the bearing and at least a portion of the first collar; and
 a bracket connected to the seat, the bracket including a first plurality of openings for selectively and removably mounting the seat to the swivel mechanism in a first location relative to the pedestal and a second plurality of openings for selectively and removably mounting the seat to the swivel mechanism in a second location relative to the pedestal wherein the seat and bracket may be dismounted from one of the first and second plurality of openings and reattached to the swivel mechanism at the other of the first and second plurality of openings.

9. The vehicle seat assembly according to claim 8, wherein the bracket mounts the seat to the first collar.

10. The vehicle seat assembly according to claim 8, further including a latch connected to the bracket for engaging the swivel mechanism to prevent rotation of the seat.

11. The vehicle seat assembly according to claim 10, wherein the latch can retain the seat in at least two orientations about the vertical axis.

12. The vehicle seat assembly according to claim 10 wherein the latch engages a portion of the swivel mechanism.

13. The vehicle seat assembly according to claim 12, wherein the second collar includes a plurality of notches for receiving a portion of the latch.

14. The vehicle seat assembly according to claim 12, wherein the swivel mechanism further includes a plate positioned adjacent the second collar and a portion of the latch is received between the second collar and the plate.

15. The vehicle seat assembly according to claim 12, wherein the portion of the latch that engages the swivel mechanism is located outside of the swivel mechanism.

16. The vehicle seat assembly according to claim 10, wherein the latch is connected to the bracket.

17. The vehicle seat assembly according to claim 10, wherein the latch rotates with the seat.

18. The vehicle seat assembly according to claim 10, further including means connected to the seat for operating the latch.

19. The vehicle seat assembly according to claim 18, wherein the means for operating the latch is a handle that rotates with the seat.

20. The vehicle seat assembly according to claim 8, wherein the bracket includes a first end and a second end and the first location is adjacent the first end of the bracket and the second location is adjacent the second end of the bracket.

21. The vehicle seat assembly according to claim 8, wherein the bracket further includes a third plurality of openings for selectively and removably mounting the seat to the swivel mechanism in a third location relative to the pedestal.

22. The vehicle seat assembly according to claim 21, wherein the bracket includes a first end and a second end and the third location is located between the first and second ends of the bracket.

23. The vehicle seat assembly according to claim 8, wherein the bracket includes a first end, a second end, a third plurality of openings for selectively and removably mounting the seat to the swivel mechanism in a third location relative to the pedestal, the first location is adjacent the first end of the bracket, the second location is adjacent the second end of the bracket and the third location is located between the first and second locations.

* * * * *